United States Patent [19]

Watanabe

[11] Patent Number: 5,286,268
[45] Date of Patent: Feb. 15, 1994

[54] PAINT MIST REMOVING APPARATUS

[75] Inventor: Makoto Watanabe, Moriguchi, Japan

[73] Assignee: Taikisha Ltd., Tokyo, Japan

[21] Appl. No.: 980,621

[22] Filed: Nov. 23, 1992

[30] Foreign Application Priority Data

Nov. 26, 1991 [JP] Japan .................................. 3-310320
Jan. 22, 1992 [JP] Japan .................................. 4-1717[U]

[51] Int. Cl.⁵ ............................................. B01D 47/10
[52] U.S. Cl. ........................................ 55/228; 55/229;
55/241; 55/DIG. 46; 454/54
[58] Field of Search ................... 454/54; 55/241, 228,
55/229, DIG. 46

[56] References Cited

U.S. PATENT DOCUMENTS

| | | | |
|---|---|---|---|
| 4,257,784 | 3/1981 | Gebhard et al. | 454/54 |
| 4,328,012 | 5/1982 | Telchuk, Jr. et al. | 55/241 |
| 4,537,120 | 8/1985 | Josefsson | 454/54 |
| 4,598,633 | 7/1986 | Otto et al. | 55/241 |
| 5,147,422 | 9/1992 | Neeley et al. | 55/241 |

FOREIGN PATENT DOCUMENTS

2120576 7/1983 United Kingdom .................. 454/54

*Primary Examiner*—Tim Miles
*Attorney, Agent, or Firm*—Webb, Burden, Ziesenheim & Webb

[57] ABSTRACT

A paint mist removing apparatus comprising a constricted passage for allowing a paint mist laden gas from a spraying chamber to flow at high velocity confluently with a cleaning liquid for delivery to an exhaust chamber; a liquid shooting section for scattering the cleaning liquid, in fine droplets in the gas flowing from a passage inlet down the constricted passage, toward a cleaning region in the constricted passage below the passage inlet; an upwardly facing inclined wall surface formed in the constricted passage for receiving droplets having captured paint mist in the gas flowing through the cleaning region, and guiding downflow of a liquid formed by collection of the droplets received; a downwardly facing wall surface formed in the constricted passage to be continuous from a lower end of the upwardly facing inclined wall surface; and a curved wall surface formed in the constricted passage between the upwardly facing inclined wall surface and the downwardly facing wall surface for deflecting the gas in the constricted passage toward the downwardly facing wall surface. The curved wall surface acts as a second liquid shooting section for separating and scattering the liquid flowing down the upwardly facing inclined wall surface, in fine droplets in the gas flowing through the constricted passage, toward a second cleaning region in the constricted passage below the downwardly facing wall surface.

10 Claims, 6 Drawing Sheets ant mist removing apparatus, and more particularly to a paint mist removing apparatus having a constricted passage for allowing a gas laden with overspray paint mist from a spraying chamber to flow at high speed, along with a cleaning liquid, down to an exhaust chamber. The constricted passage includes a liquid shooting section for scattering the cleaning liquid toward a cleaning region formed in a lower portion of the constricted passage, while reducing the cleaning liquid to fine droplets in the gas flowing down the constricted passage.

2. Description of the Related Art

As shown in FIG. 7, a paint mist removing apparatus of the type noted above has a constricted passage 12 including a cleaning region S1 disposed below a passage inlet 12a and defining a droplet thick region where cleaning liquid W is dispersed from a liquid shooting section H1 while being reduced to fine droplets. In the cleaning region S1, the liquid droplets capture overspray paint mist in a passing gas A, thereby removing the overspray paint mist from the gas A. The cleaning region S1 providing the droplet thick region is formed in an intermediate portion of the constricted passage 12 where the gas flow is maintained at high velocity. This assures a higher mist capturing efficiency than the cleaning region being formed downstream of the constricted passage 12 where the gas flow is considerably decelerated upon discharge from the constricted passage 12 to an exhaust chamber 11.

Conventionally, this type of paint mist removing apparatus, as shown in FIG. 7, has the constricted passage 12 including only one cleaning region S1 below the passage inlet 12a, and only one liquid shooting section H1 to cooperate with the cleaning region S1.

A still greater efficiency of capturing overspray paint mist is demanded today. Attempts have been made to promote the mist capturing efficiency by diminishing a sectional area of the constricted passage 12 to increase gas velocity, or by causing an increased quantity of cleaning liquid to flow through the constricted passage 12 along with gas A. The diminished sectional area of the passage or increased quantity of cleaning liquid results in a greater pressure loss in the constricted passage 12. This brings about a disadvantage of greatly increasing noise (mainly noise of the scattering cleaning liquid) leaking from the constricted passage 12 to a spraying chamber 1, thereby worsening working environment in the spraying chamber 1.

SUMMARY OF THE INVENTION

An object of the present invention is to provide an improved paint mist removing apparatus which assures a high efficiency of capturing overspray paint mist while effectively suppressing noise leakage to the spraying chamber.

The above object is fulfilled, according to the present invention, by a paint mist removing apparatus basically comprising a constricted passage for allowing a paint mist laden gas from a spraying chamber to flow at high velocity confluently with a cleaning liquid for delivery to an exhaust chamber, and a liquid shooting section for scattering the cleaning liquid, in fine droplets in the gas flowing from a passage inlet down the constricted passage, toward a cleaning region in the constricted passage below the passage inlet. This apparatus further comprises an upwardly facing inclined wall surface formed in the constricted passage for receiving droplets having captured paint mist in the gas flowing through the cleaning region, and guiding downflow of a liquid formed by collection of the droplets received, a downwardly facing wall surface formed in the constricted passage to be continuous from a lower end of the upwardly facing inclined wall surface, and a curved wall surface formed in the constricted passage between the upwardly facing inclined wall surface and the downwardly facing wall surface for deflecting the gas in the constricted passage toward the downwardly facing wall surface. The curved wall surface acts as a second liquid shooting section for separating and scattering the liquid flowing down the upwardly facing inclined wall surface, in fine droplets in the gas flowing through the constricted passage, toward a second cleaning region in the constricted passage below the downwardly facing wall surface.

This paint mist removing apparatus has the following functions and effects.

In the above construction (see FIG. 2), the constricted passage 12 includes a cleaning region S1 below the passage inlet 12a, where cleaning liquid W is allowed to scatter in fine droplets from a liquid shooting section H1. A first stage of paint mist capture is effected in the cleaning region S1 whereby the droplets trap paint mist present in the air A flowing down from the passage inlet 12a.

The droplets having captured the paint mist are received by an upwardly facing inclined wall surface "a" below the cleaning region S1. The droplets received collect into liquid W1 which flows down the upwardly facing inclined wall surface "a" with the air flowing at high velocity through the constricted passage 12. Subsequently, the air A flowing through the constricted passage 12 is deflected around a curved wall surface "b" between the upwardly facing inclined wall surface "a" and a downwardly facing wall surface "c", to flow toward the downwardly facing wall surface "c". As a result, the cleaning water W1 flowing down the upwardly facing inclined wall surface "a" is separated and scattered in fine droplets in the air A flowing through the constricted passage 12 toward a second cleaning region S2 below the downwardly facing wall surface "c". Thus, the second cleaning region S2 defines a droplet thick region where the cleaning liquid W1 is scattered in fine droplets.

That is, the curved wall surface "b" acts as a second water shooting section H2 for the second cleaning region S2 formed in a downstream portion of the constricted passage 12. Thus, the second cleaning region S2 defines a further droplet thick region similar to the upstream cleaning region S1. A second stage of paint mist capture is effected in the second cleaning region S2 inside the constricted passage 12 after the first stage paint mist capture, whereby the droplets trap the paint mist remaining in the air A.

In the above two-stage capturing mode, the noise produced at the second stage of paint mist capture, i.e. the noise produced in the portion of the constricted passage 12 downstream of the curved wall surface "b" acting as the second liquid shooting section H2, is effectively checked against leakage toward the passage inlet 12a. This is achieved since the downstream portion of the constricted passage 12 is disposed in a dead angle position as seen from the upstream cleaning region S1 (that is, as seen from the passage inlet 12a) because of the presence of the upwardly facing inclined wall surface "a" and downwardly facing wall surface "c". The noise leakage is checked also by numerous droplets formed in the upstream cleaning region S1, with the excellent sound absorbing capability inherent to droplets.

Consequently, the two stages of paint mist capture according to the present invention assure a very high mist capturing efficiency as a whole, with the cleaning regions formed in intermediate positions of the constricted passage for capturing the paint mist (that is, the cleaning regions defining the droplet thick regions formed in intermediate positions of the constricted passage where the air flow is maintained at high velocity, for capturing the paint mist with high efficiency).

Moreover, the noise produced at the second stage of paint mist capture is effectively checked against leakage toward the passage inlet while securing a high paint mist capturing efficiency. Noise leakage from the constricted passage to the spraying chamber is reduced to improve working environment in the spraying chamber. The construction according to the present invention is an improvement over the prior art construction as shown in FIG. 7 in which only a single cleaning region is formed below the passage inlet, with a reduced sectional area of the constricted passage or an increased quantity of cleaning liquid to improve the paint mist capturing efficiency.

The paint mist capture may be carried out in a different two-stage mode as shown in FIG. 4. In this construction, a paint mist laden gas A from the spraying chamber 1 is caused to flow at high velocity, along with cleaning liquid W, through an upstream constricted passage 12A, which employs the single stage capture mode in the prior art. The gas A and cleaning liquid W are delivered to an upstream exhaust chamber 11A. The cleaning liquid W is received by intermediate cleaning liquid pans 10A. Subsequently, the gas A in the upstream exhaust chamber 11 is caused to flow at high velocity, along with cleaning liquid W overflowing the intermediate cleaning liquid pans 10A, through a downstream constricted passage 12B, which also employs the single stage capture mode in the prior art. The gas A and cleaning liquid W are delivered to a downstream exhaust chamber 11B. (This mode simply corresponds to a doubled version of the conventional paint mist capture shown in FIG. 7.)

According to this mode, however, the paint mist captured by the cleaning liquid W discharged from the upstream constricted passage 12A into the upstream exhaust chamber 11A accumulates in the course of storing the cleaning liquid W in the intermediate cleaning liquid pans 10A (i.e. in transition from the first paint mist capturing stage to the second paint mist capturing stage). This results in an increase in the number of areas requiring cleaning and maintenance. Further, the exhaust chamber is divided into the upstream exhaust chamber 11A and downstream exhaust chamber 11B which render maintenance work itself difficult. Thus, the apparatus as a whole has low maintainability. In order to avoid accumulation of paint in the intermediate cleaning liquid pans, a fresh cleaning liquid may be supplied to the downstream constricted passage 12B instead of repeatedly using the cleaning liquid W discharged from the upstream constricted passage 12A.

However, this will result in an increase in the total quantity of cleaning liquid required, which will in turn increase running cost.

In the construction according to the present invention (FIG. 2), the cleaning liquid W1 flows down the upwardly facing inclined wall surface "a" at high velocity confluently with the air flowing at high velocity through the constricted passage 12, in transition from the first paint mist capturing stage to the second paint mist capturing stage. Although the cleaning liquid W used at the first paint mist capturing stage is used again at the second paint mist capturing stage, paint accumulation is effectively prevented in transition from the first paint mist capturing stage to the second paint mist capturing stage. In addition, the exhaust chamber 11 need not be divided into two parts according to the present invention, thus avoiding a deterioration in maintainability and an increase in the quantity of cleaning liquid required and in running cost.

In an embodiment of the present invention, the paint mist removing apparatus comprises a constricted passage for allowing a paint mist laden gas from a spraying chamber to flow at high velocity confluently with a cleaning liquid for delivery to an exhaust chamber and toward a side wall of the exhaust chamber, a return reservoir formed in a bottom of the exhaust chamber, and an apron floor extending from a lower end of the side wall toward the return reservoir. This apparatus further comprises a deflecting guide surface for obliquely downwardly deflecting the cleaning liquid flowing from an outlet of the constricted passage. The deflecting guide surface is disposed such that the cleaning liquid colliding therewith is deflected to concentrate on a lower end region of the side wall above the apron floor.

In the above construction (see FIG. 3), the cleaning liquid "We" discharged from the outlet 12b, i.e. the cleaning liquid "We" having captured paint mist, is obliquely downwardly deflected by a deflecting guide surface 22a. This prevents the cleaning liquid "We" from scattering over a large area of a side wall 29, thereby protecting the side wall 29 from adhesion or deposition of paint sludge.

The cleaning liquid "We" discharged from the outlet 12b may be obliquely downwardly deflected toward various positions in the exhaust chamber 11. As shown in FIG. 5, for example, the deflecting guide surface 22a may be disposed to cause the cleaning liquid "We" to collide with an upper surface of the apron floor 30. In this case, the colliding cleaning liquid "We" forms vortices in a corner between the side wall 29 and apron floor 30, which results in the disadvantage of paint sludge accumulating in large quantities in the corner. Further, the deflecting guide surface 22a may be disposed to cause the cleaning liquid "We" to flow directly into a return reservoir 15 as shown in FIG. 6. In this case, the apron floor 30 is showered with part of the incoming cleaning liquid "We" and splashes produced by the collision between the incoming cleaning liquid "We" and the cleaning liquid "We" stored in the return reservoir 15. This results in the disadvantage of paint sludge accumulating in large quantities on the apron floor 30.

In the construction according to the present invention, the deflecting guide surface 22a is disposed such that the cleaning liquid "We" colliding therewith is deflected to concentrate on a lower end region of the side wall 29 above the apron floor 30. The cleaning water "We" concentrating on the lower end region has itself a washing action (i.e. washing action in the course of flow from the concentrated collision to the return reservoir 15) to prevent adhesion and deposition of paint sludge to/on the position of collision on the side wall 29, the corner between the side wall 29 and apron floor 30 and the upper surface of the apron floor 30.

Consequently, adhesion and deposition of the paint sludge in the exhaust chamber are effectively prevented to allow cleaning and maintenance to be carried out much less frequently, thereby reducing labor and cost required therefor.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

A paint mist removing apparatus embodying the present invention will be described hereinafter with reference to the drawings.

Figure 1:
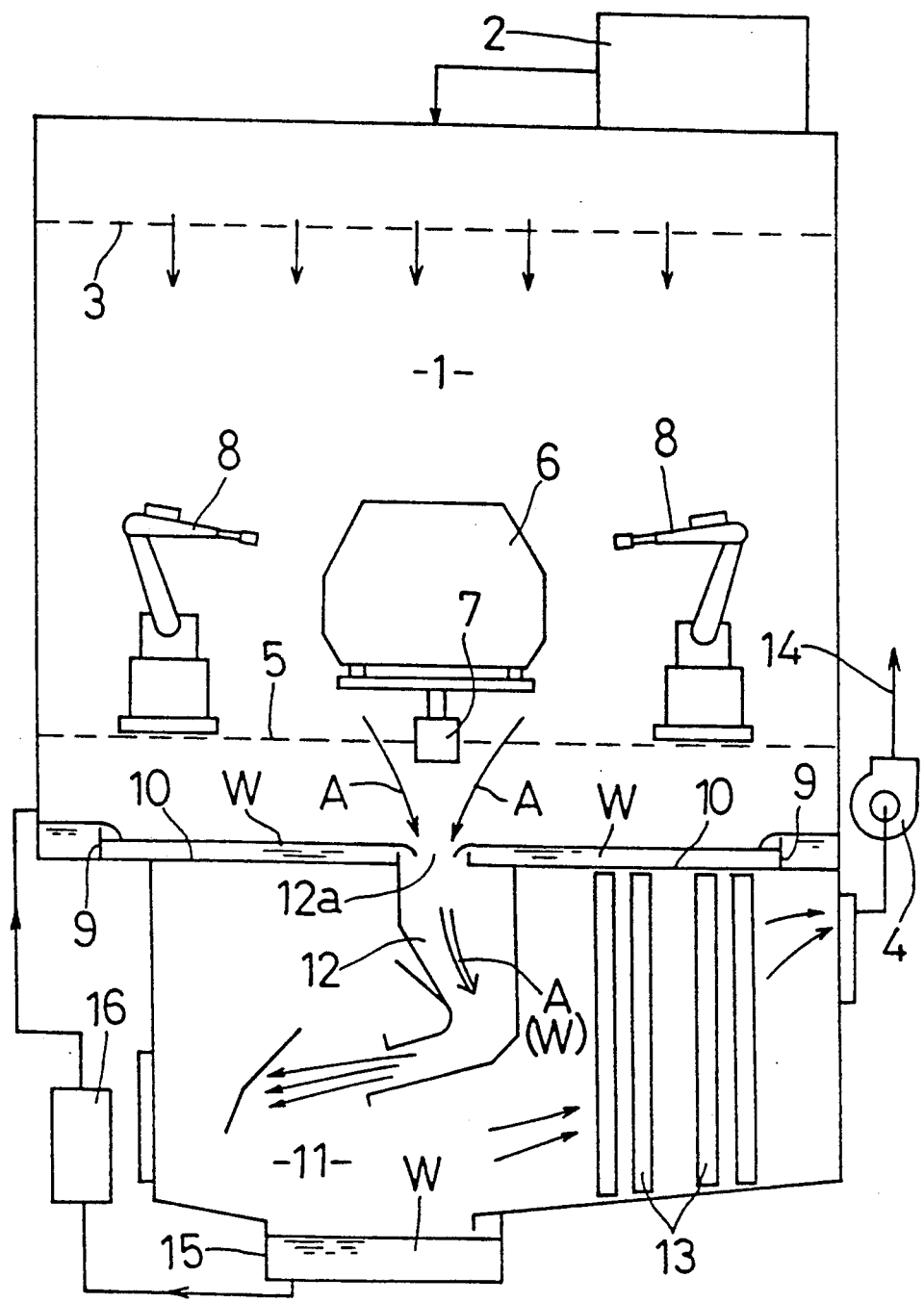
FIG. 1 is a sectional view of a spraying booth showing a paint mist removing apparatus embodying the present invention.

FIG. 1 shows a spraying booth defining a tunnel-like spraying chamber 1. The spraying chamber 1 has a ceiling defining openings 3 through which ventilating air is supplied from an air conditioner 2 downwardly into the spraying chamber 1. Further, the spraying chamber 1 has a grated floor 5 for allowing interior air A to be exhausted downwardly by suction of an exhaust fan 4. With this ventilating arrangement, overspray paint mist resulting from a spraying operation in the spraying chamber 1 and floating therein is exhausted as entrained by the air A from the spraying chamber 1.

In FIG. 1, numeral 6 denotes an object under spraying treatment, numeral 7 a conveyor for transporting the object under treatment, and numeral 8 spraying machines.

A pair of cleaning water pans 10 are disposed under the grated floor 4. The pans 10 are constantly filled with cleaning liquid W overflowing troughs 9. An exhaust chamber 11 is disposed under the cleaning water pans 10. To form an exhaust gas passage structure from a region above the cleaning water pans 10 to the exhaust chamber 11, a constricted passage 12 extends longitudinally of the booth, with a slit 12a extending longitudinally of the booth between the cleaning water pans 10 to act as a passage inlet.

The constricted passage 12 provides a paint mist removing apparatus for allowing exhaust air A from the spraying chamber 1 to flow at high velocity confluently with the cleaning water W overflowing the pans 10, whereby the cleaning water W captures the overspray paint mist contained in the exhaust air A. The exhaust air A stripped of the overspray paint mist is discharged from the exhaust chamber 11 through a draining device 13, and released through the exhaust fan 4 and an exhaust duct 14.

The cleaning water W having captured the paint mist in the exhaust air A is collected in a return reservoir 15 in the bottom of the exhaust chamber 11. Subsequently, the paint mist is separated and removed from the cleaning water W at an appropriate separating device 16. The cleaning water W stripped of the paint mist is recirculated to the overflow troughs 9 for repeated use.

Figure 2:
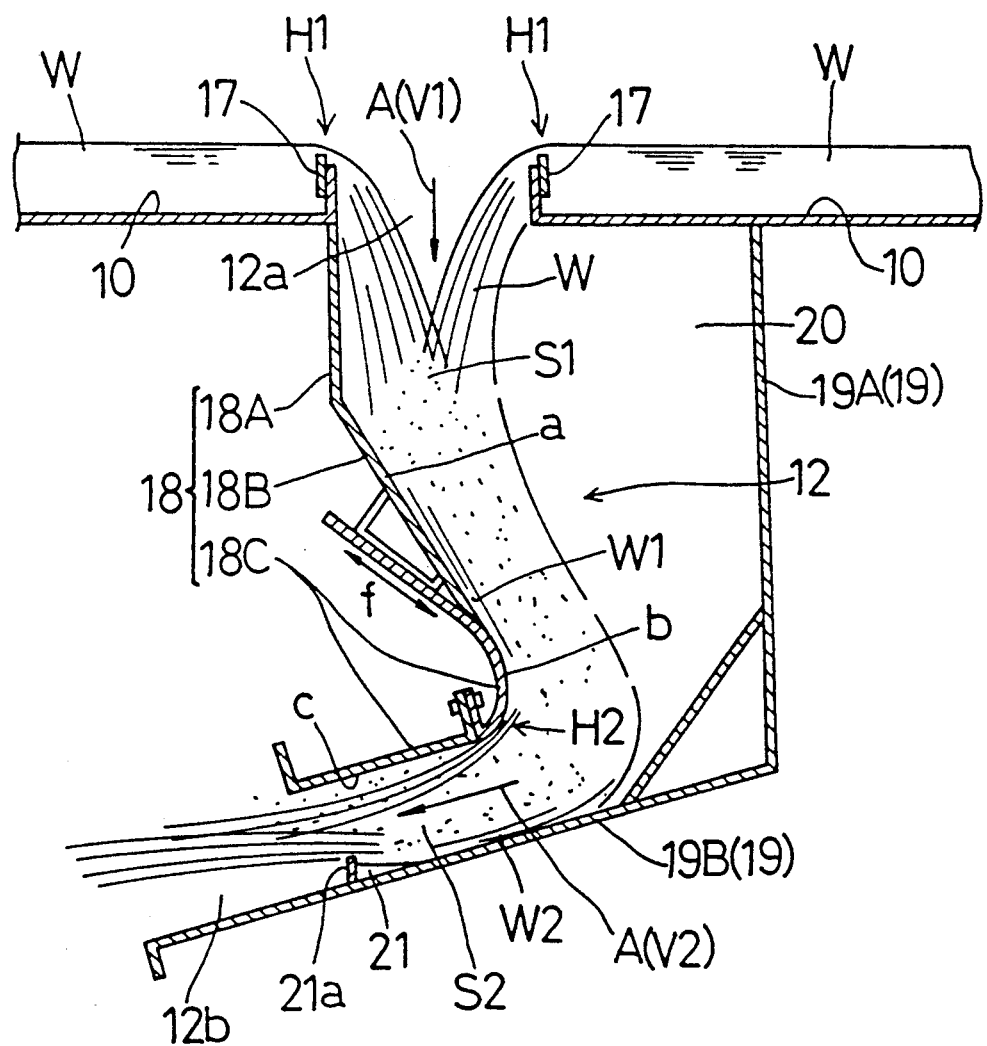
FIG. 2 is an enlarged sectional view of a constricted passage.

FIG. 2 shows a specific construction of the constricted passage 12. The constricted passage 12 includes a first cleaning region S1 formed immediately under the passage inlet 12a. Each of the cleaning water pans 10 includes an overflow barrier 17 opposed to the passage inlet 12a to act as a first water shooting section H1 for the first cleaning region S1. The cleaning water W is allowed to scatter from the first water shooting section H1 toward the first cleaning region S1, becoming fine droplets in the air A flowing down from the passage inlet 12a.

Thus, the first cleaning region S1 in the constricted passage 12 defines a droplet thick region where the cleaning water W scatters from the first water shooting section H1 in fine droplets. Consequently, a first stage of paint mist capture is effected in the first cleaning region S1 whereby the droplets trap the paint mist present in the air A flowing down the passage 12.

One side wall 18 of the constricted passage 12 includes a vertical wall portion 18A extending from the passage inlet 12a to the first cleaning region S1. The side wall 18 further includes lower wall portions 18B and 18C disposed below the first cleaning region S1 and defining a curved section protruding inwardly of the constricted passage 12. As a result, the droplets having captured the paint mist are received by the side wall 18 below the first cleaning region S1. The droplets received by the side wall 18 collect into water W1 which flows down an upwardly facing inclined wall surface "a" at high velocity with the air flowing through the constricted passage 12. Further, the upwardly facing inclined wall surface "a" is continuous at a lower end thereof to a curved wall surface "b" from which a downwardly facing wall surface "c" extends forwardly and downwardly.

The other side wall 19 of the constricted passage 12 includes an upstream wall portion 19A extending vertically, and a downstream wall portion 19B extending forwardly and downwardly and substantially parallel to the downwardly facing wall surface "c" opposed thereto. Thus, the constricted passage 12 has a downstream portion inclined forwardly and downwardly, so that the air A is deflected around the curved wall surface "b" toward the downwardly facing wall surface "c".

As noted above, the passage structure downstream of the first cleaning region S1 deflects the air A around the curved wall surface "b" toward the downwardly facing wall surface "c". As a result, the cleaning water W1 flowing down the upwardly facing inclined wall surface "a" is separated from the curved wall surface "b" to scatter in fine droplets in the air A flowing through the constricted passage 12 toward a second cleaning region S2 below the downwardly facing wall surface "c". Thus, the second cleaning region S2 defines a further droplet thick region similar to the upstream, first droplet thick region, with the curved wall surface "b" acting as a second water shooting section H2 for the second cleaning region S2. Consequently, a second stage of paint mist capture is effected in the second cleaning region S2 inside the constricted passage 12 following the first stage paint mist capture carried out in the upstream position, whereby the droplets trap the paint mist remaining in the air A.

According to the above passage structure, because of the presence of the upwardly facing inclined wall surface "a" and downwardly facing wall surface "c", the constricted passage 12 downstream of the curved wall surface "b" is disposed in a dead angle position as seen from the first cleaning region S1 and passage inlet 12a thereabove. Moreover, numerous droplets formed in the first cleaning region S1, with the excellent sound absorbing capability inherent to the droplets, damp the noise produced in the constricted passage 12 downstream of the curved wall surface "b". As a result, the noise (mainly noise of scattering water) produced in the constricted passage 12 downstream of the curved wall surface "b" at the second stage of paint mist capture is checked against leakage to the passage inlet 12a. The two stages of paint mist capture assure a high mist capturing efficiency as a whole, while effectively reducing noise leakage from the constricted passage 12 to the spraying chamber 1 to improve working environment in the spraying chamber.

A hollow space 20 is formed in the constricted passage 12 and adjacent the other side wall 19 opposed to the first cleaning region S1, which is surrounded on three sides by the bottom of one cleaning water pan 10 and the other side wall 19. This hollow space 20 also contributes toward suppression of the noise leaking from the constricted passage 12 to the spraying chamber 1.

The constricted passage 12 has a smaller sectional area in the region of the curved wall surface "b" acting as the second water shooting section H2 than in the region of the first water shooting section H1 disposed at the passage inlet 12a. Consequently, the air flows past the second water shooting section H2 at a velocity V2 which is higher than a velocity V1 at which the air flows past the first water shooting section H1. The cleaning water W is scattered in finer droplets from the second water shooting section H2 than from the first water shooting section H1. At the first stage of paint mist capture, the less fine droplets trap relatively large particles of paint mist. At the second stage of paint mist capture, the finer droplets trap small particles of paint mist remaining in the air A. Thus, a wide range of mist particles in the flowing air A may be trapped reliably.

With the above setting of air flow velocities, greater noise is produced at the second stage of paint mist capture than at the first stage. As noted hereinbefore, the noise produced in the constricted passage 12 downstream of the curved wall surface "b" at the second stage of paint mist capture is checked against leakage to the passage inlet 12a by the barrier action of the upwardly facing inclined wall surface "a" and downwardly facing wall surface "c" and by the sound absorbing action of the droplets in the first cleaning region S1. This produces the effect of reducing overall noise leakage to the spraying chamber 1.

One side wall 18 (i.e. the side wall defining the upwardly facing inclined wall surface "a", curved wall surface "b" and downwardly facing wall surface "c") of the constricted passage 12 includes the wall portion 18C defining the curved wall surface "b" and downwardly facing wall surface "c". This wall portion 18C is positionally adjustable in directions indicated by arrow "f" in FIG. 2 relative to the wall portion 18B defining the upwardly facing inclined wall surface "a". This positional adjustment allows the air velocity V2 through the second water shooting section H2 and droplet size in the second cleaning region S2 to be suitably adjusted according to operating conditions and the like.

The overflow barriers 17 constituting the first water shooting section H1 have an adjustable height. Through this height adjustment, the cleaning water W is scattered from the first water shooting section H1 into the constricted passage 12 in varied forms to appropriately adjust mist capturing conditions in the first cleaning region S1.

Numeral 21 in FIG. 2 denotes a step formed on the downstream portion 19B of the other side wall 19. Part of the droplets carried by the air A from the first cleaning region S1 collide with the forwardly inclined downstream portion 19B of the other side wall 19, without being received by the upwardly facing inclined wall surface "a", to collect into water W2. This water W2 flows down the downstream wall portion 18B at high velocity with the air A flowing at high velocity. The step 21 causes the downflowing water W2 to scatter in fine droplets again upward into the air A flowing through the constricted passage 12. The mist capturing efficiency is promoted further as a whole, since the cleaning water W2 reaching the downstream portion 19B of the other side wall 19 without being received by the upwardly facing inclined wall surface "a" is scattered again by the step 21 in addition to the cleaning water W1 flowing down the upwardly facing inclined wall surface "a" being scattered by the curved wall surface "b" acting as the second water shooting section H2.

The position of the step 21 on the downstream wall portion 19B may be selected according to a target position to which the cleaning water W2 is scattered. For example, the step 21 may be located to scatter the cleaning water W2 to a position upstream or downstream of the second cleaning region S2 to which the cleaning water W1 is scattered from the second water shooting section H2. The step 21 may scatter the cleaning water W2 to a position just outside an outlet 12b of the constricted passage 12. Further, the step 21 may scatter the cleaning water W2 right into the second cleaning region S2, so that the step 21 and curved wall surface "b" combine to act as the second water shooting section H2 for the second cleaning region S1.

An upstanding piece 21a is disposed at a forward end of the step 21 to promote scattering of the cleaning water W2. However, the upstanding piece 21a may be omitted where appropriate.

In the foregoing embodiment, the overflow barriers 17 of the cleaning water pans 10 (which may also be regarded as overflow barriers provided at the passage inlet 12a) constitute the first water shooting section H1 for the first cleaning region S1. The first water shooting section H1 is not limited to such barriers, but is variable in many ways. For example, the side walls of the constricted passage 12 may include steps formed in intermediate positions thereof to act as the first water shooting section H1 for scattering, in fine droplets, the cleaning water W flowing down the side walls.

The inclination angle of the upwardly facing inclined wall surface "a" and the curvature of the curved wall surface "b" may be determined suitably. Where appropriate, the upwardly facing inclined wall surface "a" may be in the form of an upwardly or downwardly curved surface instead of being flat. The curved wall surface "b" may be angular instead of being round. Thus, the upwardly facing inclined wall surface "a" and curved wall surface "b" may also be varied in many ways.

The angle and length of the downwardly facing wall surface "c" may be determined suitably. Where appropriate, the downwardly facing wall surface "c" may also be in the form of an upwardly or downwardly curved surface instead of being flat.

Another embodiment of the invention will be described hereinafter.

Figure 3:
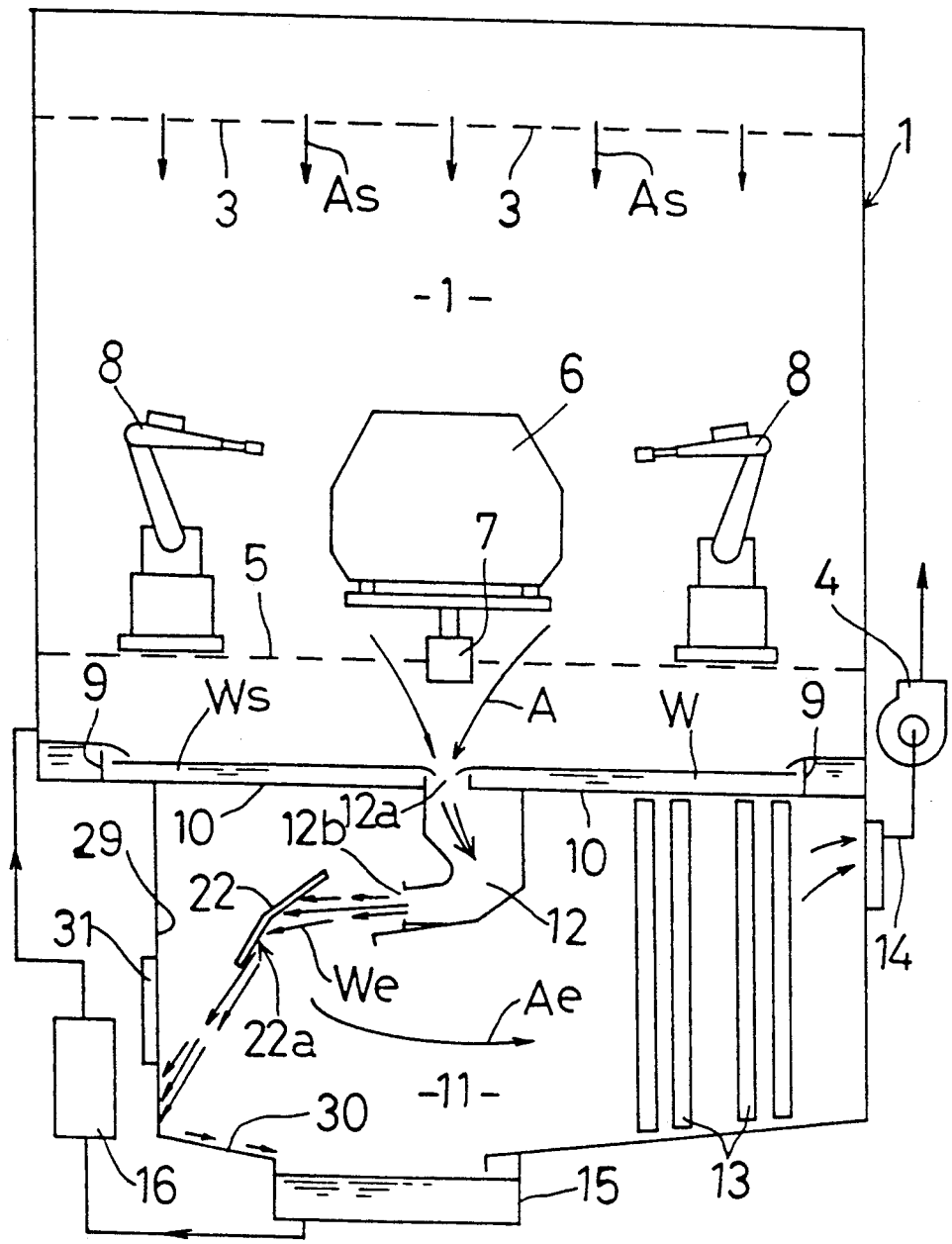
FIG. 3 is a sectional view of a spraying booth showing a paint mist removing apparatus in another embodiment of the present invention.
Figure 4:
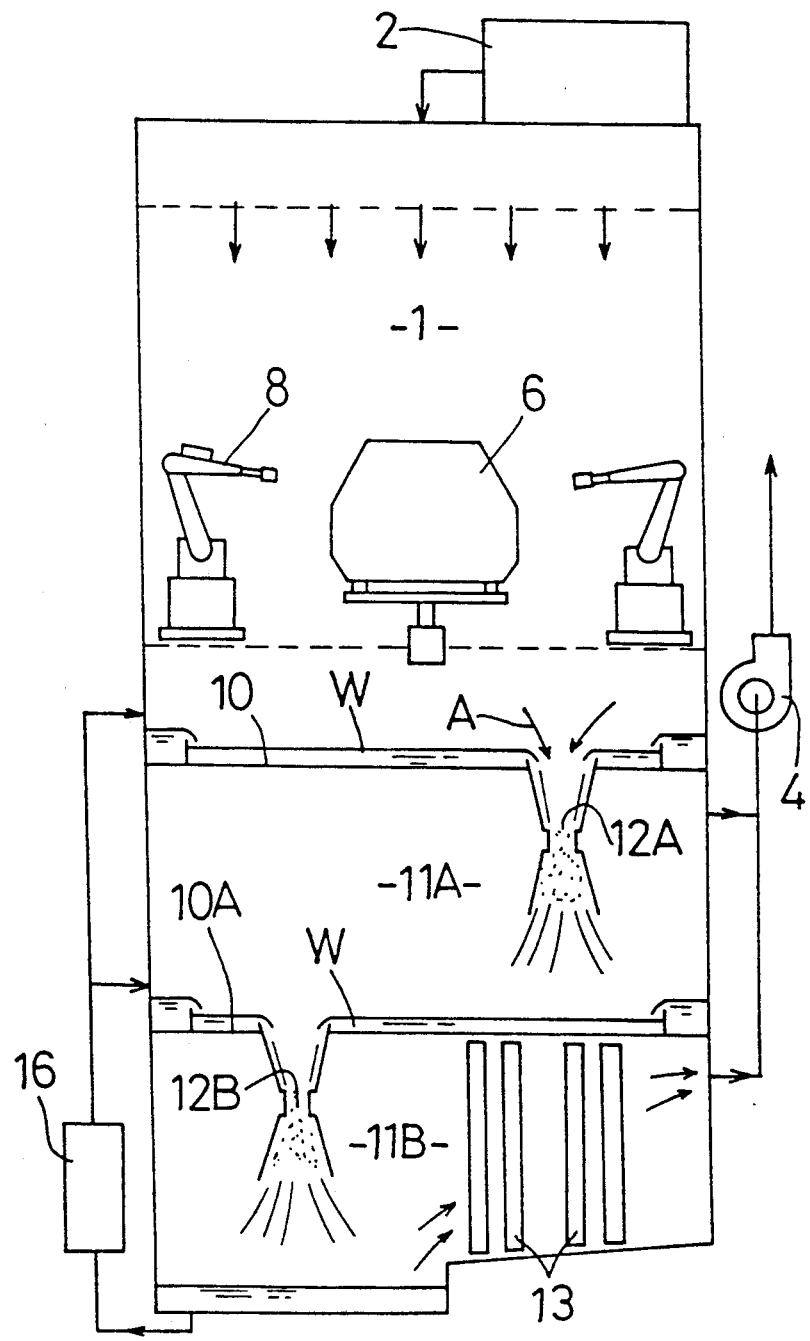
FIG. 4 is a sectional view showing a comparative example.
Figure 5:
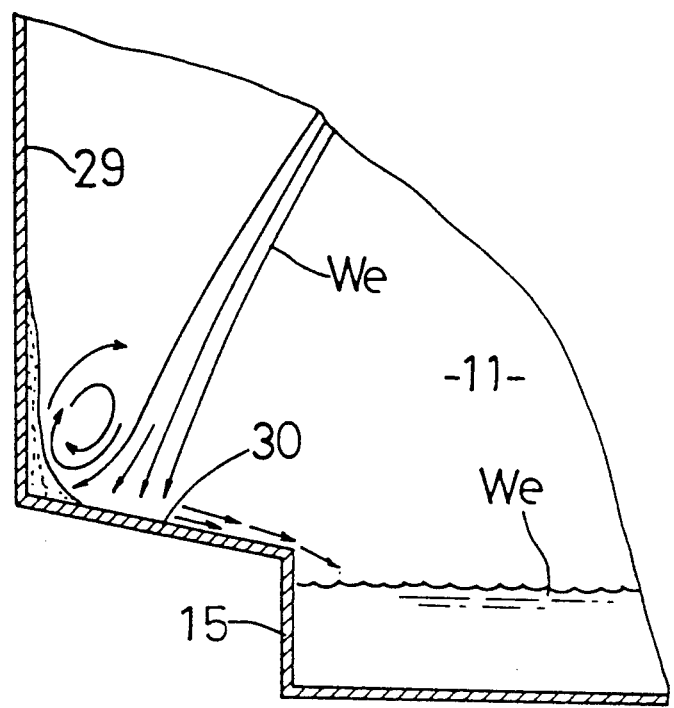
FIG. 5 is a sectional view showing another comparative example.
Figure 6:
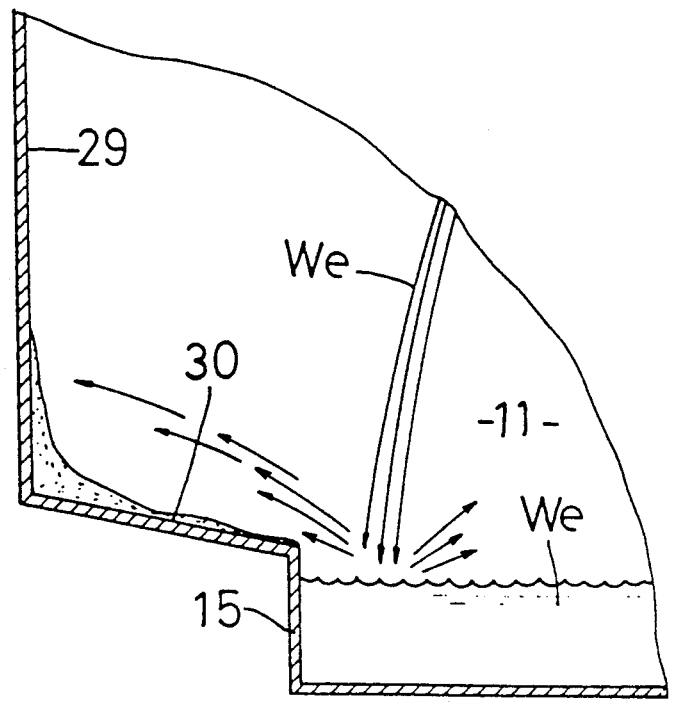
FIG. 6 is a sectional view showing a further comparative example.
Figure 7:
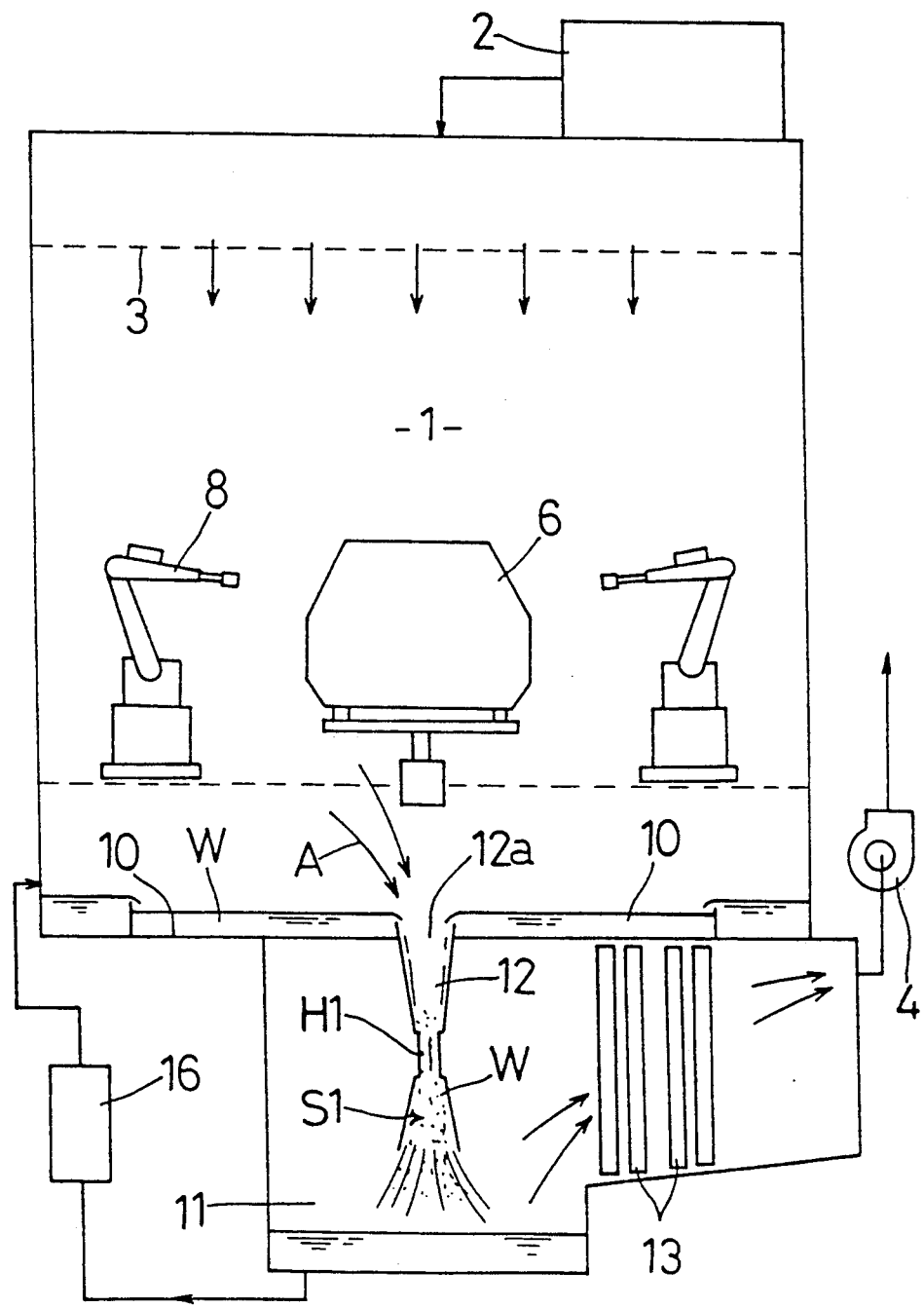
FIG. 7 is a sectional view of a conventional apparatus.

Referring to FIG. 3, a spraying booth defines a tunnel-like spraying chamber 1 having openings 3 arranged over an entire ceiling area through which ventilating air "As" is supplied downwardly. Further, the spraying chamber 1 has a grated floor 5 for allowing interior air A to be exhausted downwardly. Overspray paint mist floating in the spraying chamber 1 is exhausted by supplying the ventilating air "As" through the ceiling openings 3 and exhausting the interior air A through the grated floor 5. That is, the paint mist is discharged as entrained by the interior air A flowing out of the spraying chamber 1.

The interior air A laden with the overspray paint mist is drawn into a slit formed between right and left cleaning water pans 10 to act as a passage inlet 12a. The air A flows at high velocity through the passage inlet 12a confluently with cleaning water W overflowing downstream edges of the pans 10. The confluent fluids flow through a constricted passage 12. The passage 12 has an outlet 12b from which the fluids are discharged into an exhaust chamber 11 disposed below the cleaning water pans 10. While flowing through the constricted passage 12, the cleaning water W captures the paint mist and removes it from the air A.

The exhaust chamber 11 is connected at one lateral position of the booth to an exhaust duct 14. The exhaust chamber 11 houses a draining device 13 disposed in an intermediate position of an air path leading to the exhaust duct 14. The air discharged in confluent flow from the outlet 12b of the constricted passage 12 into the exhaust chamber 11, i.e. air "Ae" stripped of the paint mist, is dehydrated by the draining device 13, and then drawn into the exhaust duct 14 to be released to the ambient by an exhaust fan 4.

On the other hand, the cleaning water discharged in confluent flow from the outlet 12b into the exhaust chamber 11, i.e. cleaning water "We" having captured the paint mist, is collected in a return reservoir 15 in the bottom of the exhaust chamber 11. Subsequently, the paint mist or paint sludge is separated and removed from the cleaning water "We" at a separating device 16. The cleaning water stripped of the paint mist is recirculated to overflow troughs 9 for repeated use.

The outlet 12b of the constricted passage 12 opens toward a side wall 29 of the exhaust chamber 11 remote from the exhaust duct 14. This is effective to protect the draining device 13 from direct exposure to the cleaning water "We" discharged from the outlet 12b, thereby avoiding an overload of eliminator draining, and maintaining the draining device 13 free from adhesion or deposition of the paint sludge in the cleaning water. Thus, the draining device 13 is operable constantly to produce an excellent draining effect.

The side wall 29 of the exhaust chamber 11 remote from the exhaust duct 14 includes a manhole 31 to allow access to the exhaust chamber 11 for maintenance. The side wall 29 is continuous at a lower end thereof to an apron floor 30 extending toward the return reservoir 15 for use as an interior step to facilitate maintenance work.

Numeral 22 denotes a guide plate for colliding with and obliquely downwardly deflecting the cleaning water "We" flowing from the outlet 12. The guide plate 22 prevents the cleaning water "We" flowing from the outlet 12 toward the side wall 29, from scattering over a large area of the side wall 29. Consequently, a large area of the side wall 29 including the manhole 31 is protected from adhesion or deposition of the paint sludge due to diffused impingement of the cleaning water "We".

The guide plate 22 has a deflecting guide surface 22a for receiving the cleaning water "We". The guide surface 22a is disposed such that the cleaning water "We" colliding with the guide surface 22a is deflected to concentrate on a lower end region of the side wall 29 above the apron floor 30. The cleaning water "We" concentrating on the lower end region has itself a washing action (i.e. washing action in the course of flow from the concentrated collision to the return reservoir 15) to prevent adhesion or deposition of the paint sludge to/on the position of collision on the side wall 29, a corner between the side wall 29 and apron floor 30 and an upper surface of the apron floor 30.

Since the cleaning water "We" hits the deflecting guide surface 22a hard, the guide surface 22a also remains free from adhesion or deposition of the paint sludge owing to the washing action of the cleaning water "We".

The cleaning water "We" discharged from the outlet 12b with the air "Ae" is a mixture of large droplets and small droplets. Since the cleaning water "We" hits the deflecting guide surface 22a hard, such droplets are reduced to a water film on the guide surface 22a. Thus, the fine droplets discharged from the outlet 12b are entrained in a reduced quantity on the air to reach the draining device 13. This further reduces the draining load of the draining device 13.

The component defining the deflecting guide surface 22a in the exhaust chamber 11 is variable. The deflecting guide surface 22a in the above embodiment is dented to form a recess facing downward. Instead, the deflecting guide surface 22a may simply be flat or may be curved.

The corner between the side wall 29 and apron floor 30 may be rounded to have an arcuate section to smooth downflow of the cleaning water.

The manhole 31 may be omitted from the side wall 29, or may be disposed in a location different from that illustrated in FIG. 3.

The gas from which the paint mist is removed and the cleaning liquid W are not limited to air and water, respectively. The cleaning liquid W may be an aqueous solution of a chemical substance or one of various liquid substances.

What is claimed is:
1. A paint mist removing apparatus comprising:

(a) a first chamber wherein paint may be applied to an object;

(b) a second chamber adjacent to said first chamber;

(c) a first panel including a first side plate and a second panel including a second side plate, said panels positioned between said first and second chambers and forming a passage inlet opening between said first and second chambers;

(d) a continuous first side wall within said second chamber including a vertical wall attached to said first panel at said first side plate, an upwardly facing inclined wall surface attached to said vertical wall, a curved wall surface extending below said inclined wall surface and a downwardly facing inclined wall surface attached to and extending below said curved wall surface;

(e) a substantially vertical second side wall within said second chamber substantially parallel to said vertical wall and attached to said second panel at a point substantially removed from said second side plate to form an area including a hollow space through which air and cleaning liquid from said inlet opening may pass and formed such that said area is substantially wider than said inlet opening; and (f) an overflow barrier provided at said inlet opening to form a liquid shooting section for scattering a cleaning liquid into fine droplets through a paint laden gas from said passage inlet through a constricted passage formed from said passage inlet along said first side wall, wherein a first cleaning region is formed inside said constricted passage between said passage inlet and said upwardly facing inclined wall surface, and a second cleaning region is formed inside said constricted passage downstream of said curved wall surface which further scatters the cleaning liquid and guides the cleaning liquid in fine droplets toward said downwardly facing inclined wall surface for effecting a second stage of paint mist capture.

2. A paint mist removing apparatus as defined in claim 1, further comprising cleaning liquid pan means disposed below said spraying chamber and defining said passage inlet substantially centrally thereof, said liquid shooting section including overflow barriers disposed between said cleaning liquid pan means and said constricted passage.

3. A paint mist removing apparatus as defined in claim 2, wherein said overflow barriers have an adjustable height for adjusting forms in which said cleaning liquid is scattered from said liquid shooting section into said constricted passage.

4. A paint mist removing apparatus as defined in claim 1, further comprising a return reservoir positioned in a bottom of an exhaust chamber for collecting cleaning liquid which has captured said paint mist from said paint mist laden gas;

a means for stripping said paint from said cleaning liquid; and a means for recirculating said cleaning liquid to at least one overflow trough for repeated use in filling said clean liquid pan means.

5. The paint mist removing apparatus as claimed in claim 4, wherein said return reservoir is constructed such that a receiving area includes a position immediately below an end of a downstream wall portion so as to directly receive droplets of the cleaning liquid from said downstream end.

6. A paint mist removing apparatus as defined in claim 1, wherein said exhaust chamber includes a return reservoir formed in a bottom thereof, and an apron floor extending from a lower end of a side wall of said exhaust chamber toward said return reservoir.

7. A paint mist removing apparatus as defined in claim 6, further comprising a deflecting guide surface for obliquely downwardly deflecting said cleaning liquid flowing from an outlet of said constricted passage, said deflecting guide surface being disposed such that said cleaning liquid colliding therewith is deflected to concentrate on a lower end region of said side wall above said apron floor.

8. A paint mist removing apparatus as defined in claim 7, wherein said deflecting guide surface is dented to form a recess facing downward.

9. A paint mist removing apparatus comprising:

(a) a first chamber wherein paint may be applied to an object;

(b) a second chamber adjacent to said first chamber;

(c) a first pan including a first side plate and a second pan including a second side plate, said pans capable of holding a cleaning liquid and forming a passage inlet between said first and second chamber;

(d) a continuous first side wall within said second chamber including a vertical wall attached to said first panel at said first side plate, an upwardly facing inclined wall surface attached to said vertical wall, a curved wall surface extending below said inclined wall surface and a downwardly facing inclined wall surface attached to and extending below said curved wall surface;

(e) a substantially vertical second side wall within said second chamber substantially parallel to said vertical wall and attached to said second panel at a point substantially removed from said second side plate to form an area including a hollow space through which air and cleaning liquid from said inlet opening may pass and formed such that said area is substantially wider than said inlet opening;

(f) an overflow barrier provided at said inlet opening to form a liquid shooting section for scattering a cleaning liquid into fine droplets through a paint laden gas from said passage inlet through a constricted passage formed from said passage inlet along said first side wall, wherein a first cleaning region is formed inside said constricted passage between said passage inlet and said upwardly facing inclined wall surface, and a second cleaning region is formed inside said constricted passage downstream of said curved wall surface which further scatters the cleaning liquid and guides the cleaning liquid in fine droplets toward said downwardly facing inclined wall surface for effecting a second stage of paint mist capture; and (g) a return reservoir formed in a bottom of an exhaust.

10. A paint mist removing apparatus comprising:

(a) a first chamber wherein paint may be applied to an object;

(b) a second chamber adjacent to said first chamber;

(c) a first pan including a first side plate and a second pan including a second side plate, said pans capable of holding a cleaning liquid and forming a passage inlet between said first and second chamber;

(d) a continuous first side wall within said second chamber including a vertical wall attached to said first panel at said first side plate, an upwardly facing inclined wall surface attached to said vertical wall, a curved wall surface extending below said inclined wall surface and a downwardly facing inclined wall surface attached to and extending below said curved wall surface;

(e) a substantially vertical second side wall within said second chamber substantially parallel to said vertical wall and attached to said second panel at a point substantially removed from said second side plate to form an area including a hollow space through which air and cleaning liquid from said inlet opening may pass and formed such that said area is substantially wider than said inlet opening;

(f) an overflow barrier provided at said inlet opening to form a liquid shooting section for scattering a cleaning liquid into fine droplets through a paint laden gas from said passage inlet through a constricted passage formed from said passage inlet along said first side wall, wherein a first cleaning region is formed inside said constricted passage between said passage inlet and said upwardly facing inclined wall surface, and a second cleaning region is formed inside said constricted passage downstream of said curved wall surface which further scatters the cleaning liquid and guides the cleaning liquid in fine droplets toward said downwardly facing inclined wall surface for effecting a second stage of paint mist capture;

(g) a return reservoir formed in a bottom of an exhaust; and (h) an apron floor extending from a lower end of a side wall of said exhaust chamber toward said return reservoir.

* * * * *